United States Patent
Aizawa et al.

(10) Patent No.: US 10,915,087 B2
(45) Date of Patent: Feb. 9, 2021

(54) NUMERICAL CONTROL DEVICE

(71) Applicant: FANUC CORPORATION, Yamanashi (JP)

(72) Inventors: Nobuaki Aizawa, Yamanashi (JP); Shouki Tani, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 56 days.

(21) Appl. No.: 16/393,595

(22) Filed: Apr. 24, 2019

(65) Prior Publication Data
US 2019/0332086 A1  Oct. 31, 2019

(30) Foreign Application Priority Data
Apr. 26, 2018 (JP) ................. 2018-085079

(51) Int. Cl.
G05B 19/402 (2006.01)
G05B 19/18 (2006.01)
(Continued)

(52) U.S. Cl.
CPC ........ G05B 19/402 (2013.01); B23Q 11/1076 (2013.01); B23Q 17/249 (2013.01); G05B 19/182 (2013.01); G05B 2219/34082 (2013.01); G05B 2219/37559 (2013.01); G05B 2219/50248 (2013.01)

(58) Field of Classification Search
CPC ............... G05B 19/402; G05B 19/182; G05B 2219/34082; G05B 2219/37559; G05B 2219/50248; B23Q 11/1076; B23Q 17/249
See application file for complete search history.

(56) References Cited

U.S. PATENT DOCUMENTS 4,573,833 A * 3/1986 Kondo ............... G05B 19/42 408/3
2009/0272245 A1* 11/2009 Voice ............... B26F 3/004 83/875

(Continued)

FOREIGN PATENT DOCUMENTS

CN 104440378 A 3/2015
JP S63237837 A 10/1988
(Continued)

OTHER PUBLICATIONS

An Office Action mailed by the Japanese Patent Office dated Mar. 3, 2020, which corresponds to Japanese Design Application No. 2018-085079 with English translation.

Primary Examiner — Thomas C Lee
Assistant Examiner — Gary Collins
(74) Attorney, Agent, or Firm — Studebaker & Brackett PC

(57) ABSTRACT

To provide a numerical control device capable of directly determining whether or not a cutting fluid is applied to a cutting point. A numerical control device includes a determination unit configured to make, on a basis of image data acquired when a vision sensor photographs a cutting fluid jetted from an injection nozzle toward a cutting point, determination of whether or not the cutting fluid is applied to the cutting point, and an instruction unit configured to issue an instruction to a nozzle control device configured to control a position and an attitude of the injection nozzle on a basis of a result of the determination of the determination unit.

2 Claims, 3 Drawing Sheets

(51) Int. Cl.
*B23Q 17/24* (2006.01)
*B23Q 11/10* (2006.01)

(56) References Cited

U.S. PATENT DOCUMENTS

| | | | | |
|---|---|---|---|---|
| 2012/0308323 | A1* | 12/2012 | Gardner | B23Q 11/1076 409/84 |
| 2013/0134238 | A1* | 5/2013 | Shirahama | B23Q 15/26 239/589 |
| 2016/0236351 | A1* | 8/2016 | Kunihiro | B23Q 17/249 |
| 2017/0359943 | A1* | 12/2017 | Calleija | A01M 7/006 |
| 2018/0029183 | A1* | 2/2018 | Yellin | B23Q 11/1076 |

FOREIGN PATENT DOCUMENTS

| | | |
|---|---|---|
| JP | H04098545 U | 8/1992 |
| JP | H07276184 A | 10/1995 |
| JP | H10135100 A | 5/1998 |
| JP | H11267949 A | 10/1999 |
| JP | 2012218102 A | 11/2012 |
| JP | 2016150399 A | 8/2016 |
| JP | 2019147205 A | 9/2019 |

* cited by examiner

US 10,915,087 B2

NUMERICAL CONTROL DEVICE

This application is based on and claims the benefit of priority from Japanese Patent Application No. 2018-085079, filed on 26 Apr. 2018, the content of which is incorporated herein by reference.

BACKGROUND OF THE INVENTION

Field of the Invention

The present invention relates to a numerical control device for controlling a machine tool.

Related Art

A machine tool including an injection nozzle in the vicinity of a spindle to which a cutting tool is attached in order to apply a cutting fluid to a cutting point of the cutting tool (a point at which the cutting tool and a workpiece come into contact with each other during machining) has been known (refer to Patent Document 1, as an example). The angle of the injection nozzle is required to be adjusted according to the length and the diameter of the cutting tool. The machine tool disclosed in Patent Document 1 acquires the relation data between the flow rate of refrigerant or the inclination angle of the injection nozzle and the injection path of the refrigerant, for each of a plurality of cutting tools in advance through experiments. In the case where an arbitrary cutting tool is called from among the plurality of cutting tools, the machine tool adjusts the angle of the injection nozzle by referring to the above-described relation data on the cutting tool.

Patent Document 1: Japanese Unexamined Patent Application, Publication No. 2016-150399

SUMMARY OF THE INVENTION

However, the machine tool disclosed in Patent Document 1 is configured to perform control to position the injection nozzle to an intended position so that the refrigerant is applied to the cutting point, but not to detect whether or not the refrigerant is directly applied to the cutting point. Accordingly, a device capable of determining whether or not the cutting fluid is applied to the cutting point is required, as a more direct and reliable method.

The present invention has been made in view of the above-described problems. The object of the present invention is to provide a numerical control device capable of directly determining whether or not a cutting fluid is applied to a cutting point.

(1) A numerical control device (for example, a numerical control device 10 to be described below) according to the present invention includes a determination unit (for example, a determination unit 17 to be described below) configured to make, on a basis of image data acquired when a visual sensor (for example, a vision sensor 5 to be described below) photographs a cutting fluid (for example, a cutting fluid F to be described below) jetted from an injection nozzle (for example, an injection nozzle 3 to be described below) toward a cutting point (for example, a cutting point P to be described below), determination of whether or not the cutting fluid is applied to the cutting point, and an instruction unit (for example, an instruction unit 18 to be described below) configured to issue an instruction to a nozzle control device (for example, a nozzle control device 4 to be described below) configured to control a position and an attitude of the injection nozzle on a basis of a result of the determination of the determination unit.

(2) In the numerical control device according to (1), the determination unit may make the determination on a basis of a shape of a path of the cutting fluid extracted from the image data.

(3) In the numerical control device according to (1), the determination unit may make the determination by pattern matching.

(4) In the numerical control device according to (1), the determination unit may make the determination by machine learning.

The present invention enables to provide a numerical control device capable of directly determining whether or not a cutting fluid is applied to a cutting point.

DETAILED DESCRIPTION OF THE INVENTION

One embodiment of the present invention will be described below in detail with reference to the drawings.

Figure 1:
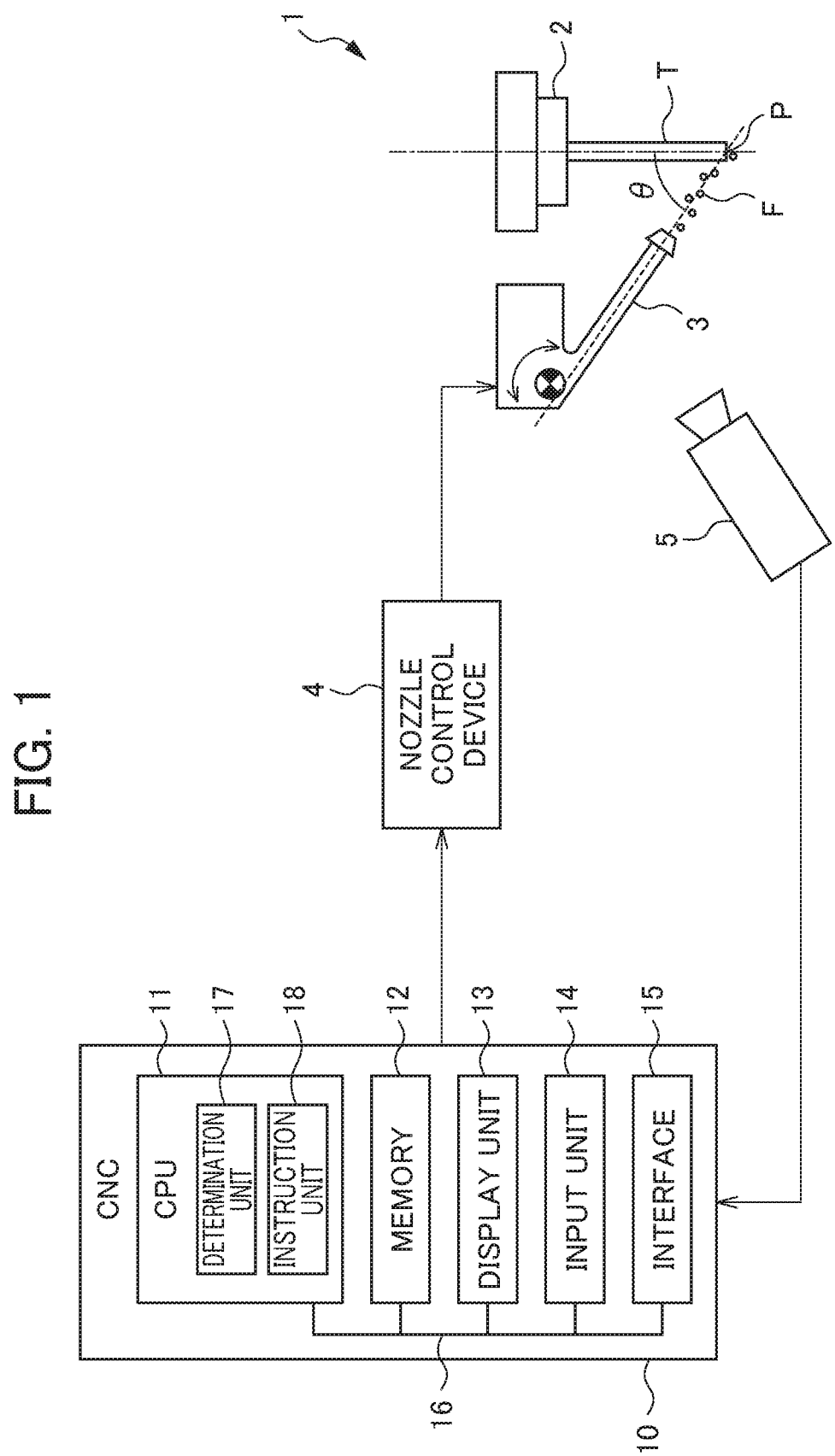
FIG. 1 is a schematic diagram illustrating a configuration of a machine tool including a numerical control device according to one embodiment of the present invention.
Figure 2A:
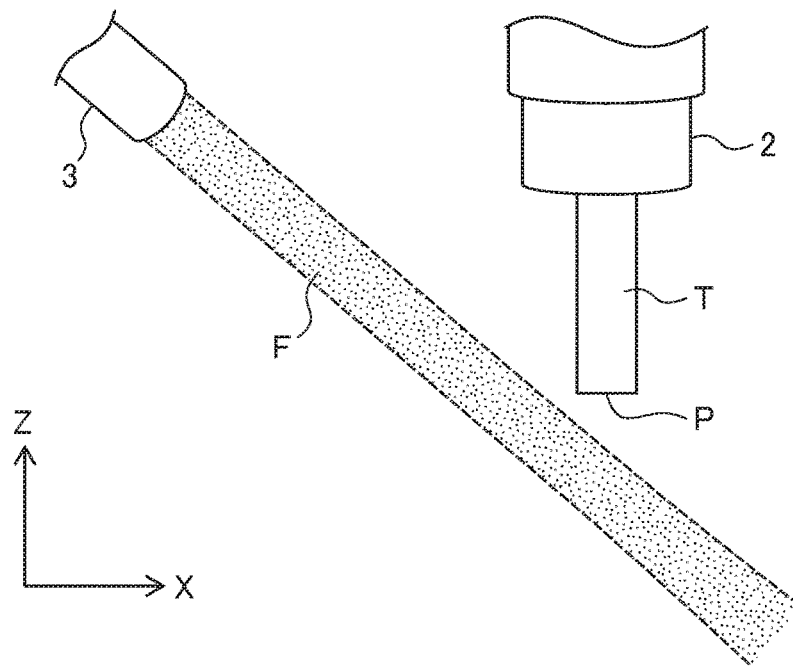
FIG. 2A is a schematic diagram of the image data acquired by a vision sensor when a cutting fluid is not applied to a cutting point.
Figure 2B:
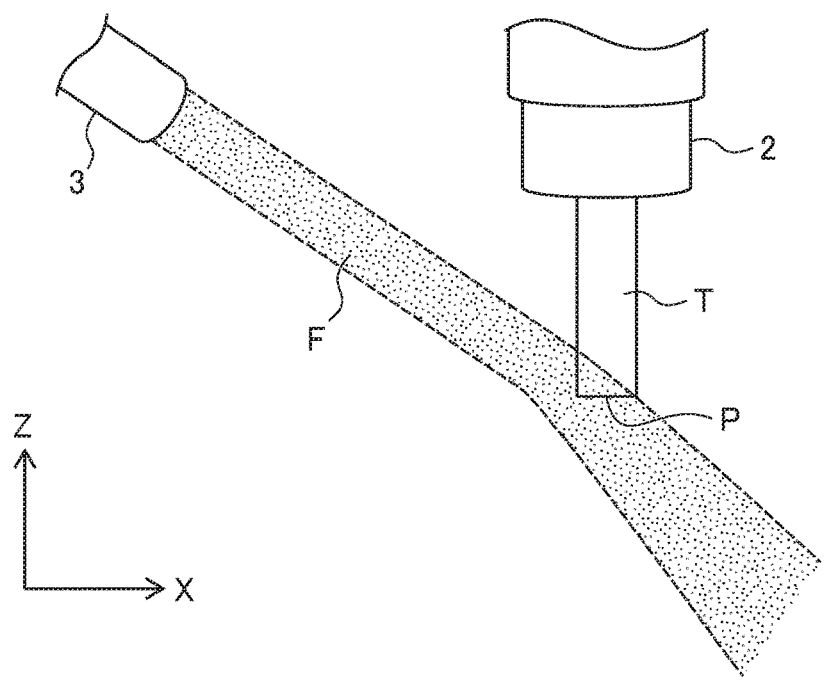
FIG. 2B is a schematic diagram of the image data acquired by the vision sensor when the cutting fluid is applied to the cutting point.

The next description with reference to FIG. 1, FIG. 2A, and FIG. 2B is about the configuration of a machine tool 1 including a numerical control device 10. FIG. 1 is a schematic diagram illustrating a configuration of the machine tool 1 including the numerical control device 10 according to one embodiment of the present invention. FIG. 2A is a schematic diagram of the image data acquired by a vision sensor 5 of the case where a cutting fluid F is not applied to a cutting point P. FIG. 2B is a schematic diagram of the image data acquired by the vision sensor 5 of the case where the cutting fluid F is applied to the cutting point P.

When machining a workpiece (not shown), the machine tool 1 shown in FIG. 1 applies the cutting fluid F to the cutting point P of a cutting tool T, specifically, to the point which is the tip portion of the cutting tool T and which comes into contact with the workpiece during machining. This application exhibits effects such as reduction of friction and cooling between the cutting tool T and the workpiece, and allows smooth cutting.

More specifically, the machine tool 1 according to the present embodiment controls the position and the attitude of an injection nozzle 3 (the angle of the injection nozzle in the present embodiment) so that the cutting fluid is applied to the cutting point P, in the state prior to the cutting of the workpiece, that is, in the state where the cutting tool T is positioned away from the workpiece before the cutting tool T approaches the workpiece, and where a spindle 2 to be described below is not rotating. Then, whether or not the cutting fluid is applied to the cutting point P is determined, on the basis of the image data acquired by the vision sensor 5. The machine tool 1 according to the present embodiment is characterized in that the machine tool 1 determines whether or not the cutting fluid is actually applied to the cutting point P. The determination will be described below in detail. After determining that the cutting fluid is actually applied to the cutting point P, the machine tool 1 controls and brings the cutting tool T into contact with the workpiece while keeping the relative positions of the cutting tool T and the injection nozzle 3, and then executes a cutting work.

The machine tool 1 includes the spindle 2, the injection nozzle 3, a nozzle control device 4, the vision sensor 5, the numerical control device 10, and the like.

An arbitrary cutting tool T selected among the plurality of the cutting tools T is attached to the spindle 2 in an exchangeable manner. The spindle 2 is controlled by the numerical control device 10.

The injection nozzle 3 is disposed in the vicinity of the spindle 2 so as to jet the cutting fluid F toward the cutting point P of the cutting tool T. The position and the attitude (an angle θ) of the injection nozzle 3 are controlled by the nozzle control device 4. The injection nozzle 3 according to the present embodiment is disposed to be rotatable in the vertical direction (in the Z direction in FIG. 2A and FIG. 2B), and the angle θ of the injection nozzle 3 with respect to the cutting tool T is controlled (refer to FIG. 1).

The nozzle control device 4 controls the position and the attitude of the injection nozzle 3 on the basis of an instruction issued by the numerical control device 10, to apply the cutting fluid F jetted from the injection nozzle 3 to the cutting point P. The nozzle control device 4 according to the present embodiment controls the rotation in the vertical direction of the injection nozzle 3, to control the angle θ of the injection nozzle 3 with respect to the cutting tool T (refer to FIG. 1).

The vision sensor 5 acquires image data by photographing the cutting fluid F jetted from the injection nozzle 3 toward the cutting point P of the cutting tool T, and inputs the image data as a signal into the numerical control device 10. The vision sensor 5 may be fixed to the machine tool 1, or may be attached to a robot (not shown).

The numerical control device (CNC) 10 includes a CPU 11, a memory 12, a display unit 13, an input unit 14, an interface 15, a bus 16 and the like.

The CPU 11 is a processor for totally controlling the machine tool 1. The CPU 11 is connected to the memory (storage unit) 12, the display unit 13, the input unit 14 and the interface 15, via the bus 16.

The memory 12 is configured with a ROM, a RAM, a nonvolatile memory, and the like. The memory 12 stores the position of the cutting point P as position data. The display unit 13 displays information necessary for an operator. The input unit 14 is a keyboard or the like by which various types of instructions and data are input. The interface 15 is connected to an external storage medium, a host computer or the like, to exchange various types of instructions and data.

The CPU 11 includes a determination unit 17 and an instruction unit 18.

The determination unit 17 determines whether or not the cutting fluid F is applied to the cutting point P, by using the image data acquired by the vision sensor 5, and inputs the determination result into the instruction unit 18. The determination unit 17 extracts the path of the cutting fluid F from the image data input as a signal by the vision sensor 5, and determines whether or not the cutting fluid F is applied to the cutting point P on the basis of the shape of the path of the cutting fluid F.

Specifically, in the present embodiment, the determination unit 17 focuses on the edge portions of the path of the cutting fluid F in the image data acquired by the vision sensor 5, and detects such edge portions by pattern matching. In an example, the determination unit 17 detects the edge portions of the path by pattern matching, and in the case of detecting that the path of the cutting fluid F has a linear shape (refer to FIG. 2A), the determination unit 17 determines that the cutting fluid F is not applied to the cutting point P.

On the other hand, in the case where, in detecting the edge portions of the path, the determination unit 17 detects that the path of the cutting fluid F does not have a linear shape and is bent in the middle thereof, or that the path widely spreads and is diffused in the middle (refer to FIG. 2B), the determination unit 17 determines that the cutting fluid F is applied to the cutting point P.

The instruction unit 18 issues an instruction to the nozzle control device 4 on the basis of the determination result input as a signal by the determination unit 17.

The numerical control device 10 according to the present embodiment including the above-described configuration exhibits the following effects.

In the numerical control device 10 according to the present embodiment including the vision sensor 5 introduced, the determination unit 17 determines whether or not the cutting fluid F is applied to the cutting point P, and feeds back the determination result to the nozzle control device 4. Accordingly, the determination whether or not the cutting fluid is applied to the cutting point is made more directly and reliably in comparison with the prior art.

Further, in the numerical control device 10 according to the present embodiment, the state in which the cutting fluid is applied to the cutting point is detected directly. Accordingly, although the angle of the injection nozzle 3 for each cutting tool T is not stored in advance in the memory 12, the position and the attitude of the injection nozzle 3 are able to be adjusted. In addition, the correspondence relation between the cutting tool T and the injection nozzle 3 needs not to be manually set in advance. Therefore, even in the case where the data (length and diameter) on the cutting tool T stored in the memory 12 is changed, the correspondence relation between the cutting tool T and the injection nozzle 3 needs not to be revised.

Although the embodiment of the present invention has been described so far, the present invention is not limited to the embodiment described above. The effects described in the present embodiment are listed merely as the most preferable effects produced by the present invention. The effects produced by the present invention are not limited to those described in the present embodiment.

In the description of the above embodiment, the determination unit 17 makes the determination by detecting the edge portions of the path of the cutting fluid F extracted from the image data by pattern matching. The present invention is not limited thereto.

In an example, the determination unit 17 may make the determination by detecting feature points on the path of the cutting fluid by pattern matching. Alternatively, the determination unit 17 may make the determination by detecting the shape of the entire path of the cutting fluid by pattern matching. In this case, the determination unit 17 extracts feature points correlated with the shape of the entire path of the cutting fluid F from the image data input as a signal by the vision sensor 5, and makes the determination on the basis of the feature points. That is, the determination unit 17 makes the determination on the basis of the similarity between the feature points extracted from the image data and the feature points stored in the memory 12.

Figure 3A:
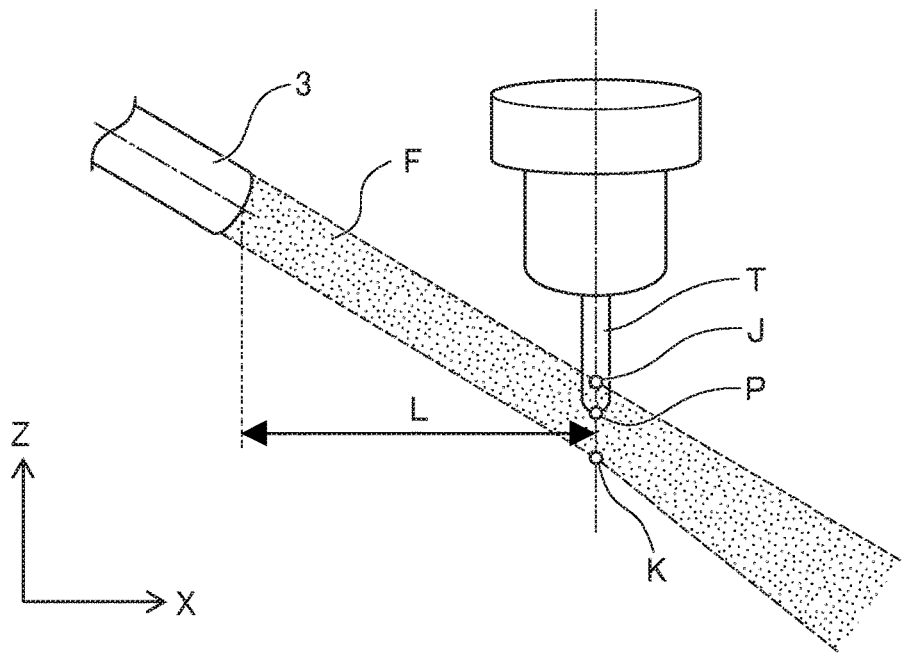
FIG. 3A is a diagram illustrating a modification of a method for determining whether or not the cutting fluid is applied to the cutting point.
Figure 3B:
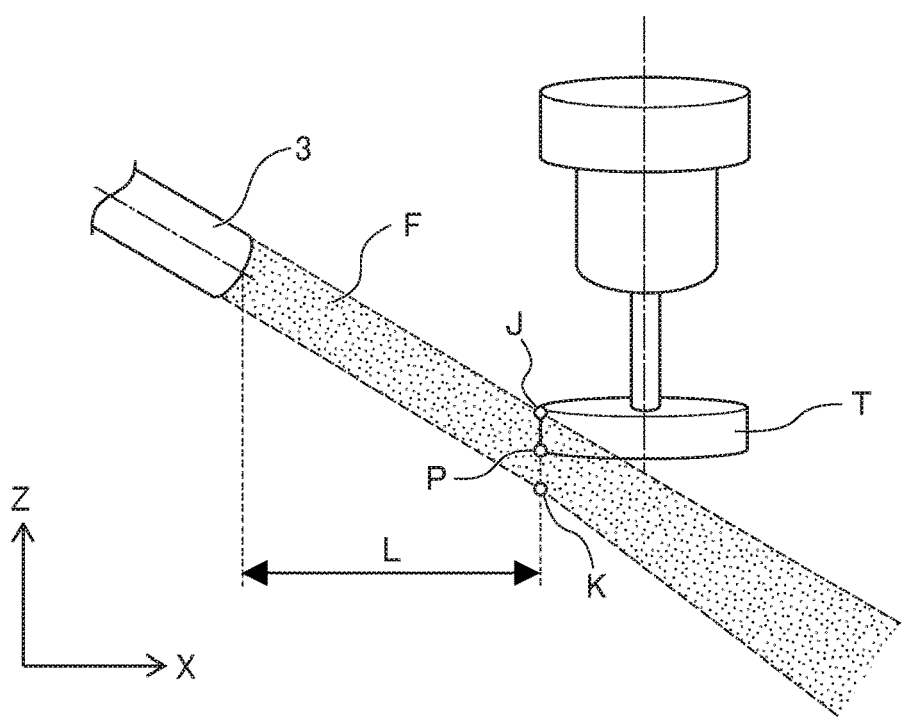
FIG. 3B is a diagram illustrating another modification of a method for determining whether or not the cutting fluid is applied to the cutting point

Each of FIG. 3A and FIG. 3B illustrates a modification of a method for determining whether or not the cutting fluid F is applied to the cutting point P. More specifically, FIG. 3A illustrates the state in which the cutting fluid F is applied to the cutting point P of the cutting tool T having a cutting blade at the tip of a columnar shaft portion. FIG. 3B illustrates the state in which the cutting fluid F is applied to the cutting point P of the cutting tool T having a cutting blade having a disc shape at the tip of a columnar shaft portion. As shown in each of FIG. 3A and FIG. 3B, only the portion of the path of the cutting fluid F from the injection nozzle 3 to the cutting point P may be extracted, and whether or not the cutting fluid F is applied to the cutting point P may be determined on the basis of the position of the cutting point P and the positions of a point J and a point K on the edge portions of the path of the cutting fluid F.

More specifically, the edge portions of the cutting fluid F in a range L (a range L in the X direction in each of FIG. 3A and FIG. 3B) from the injection nozzle 3 to the cutting point P are extracted from the image data acquired by the vision sensor, and the positions of the point J positioned on the upper edge and the point K on the lower edge and the position of the cutting point P are detected. In the case where the cutting point P is positioned between the point J and the point K, it is determined that the cutting fluid F is applied to the cutting point P. On the other hand, in the case where the cutting point P is not positioned between the point J and the point K, it is determined that the cutting fluid F is not applied to cutting point P. It is noted that this method assumes that the injection nozzle 3 is directed to the center of the spindle 2. This assumption is set because, in the case where the injection nozzle 3 is not directed to the center of the spindle 2, the cutting fluid F is not applied to the cutting point P even if the attitude of the nozzle is adjusted.

In an example, the determination unit 17 may make the determination by detecting the shape of the path of the cutting fluid by machine learning. The machine learning herein may be of supervised learning or unsupervised learning. In the case where the determination is made by machine learning, the determination unit 17 takes the image data acquired by the vision sensor 5 as an input value, and outputs a value regarding the determination result of whether or not the cutting fluid is applied to the cutting point, on the basis of the enormous image data stored in advance in the memory 12.

EXPLANATION OF REFERENCE NUMERALS

1 MACHINE TOOL
2 SPINDLE
3 INJECTION NOZZLE
4 NOZZLE CONTROL DEVICE
5 VISION SENSOR
10 NUMERICAL CONTROL DEVICE
11 CPU
12 MEMORY (STORAGE UNIT)
13 DISPLAY UNIT
14 INPUT UNIT
15 INTERFACE
16 BUS
17 DETERMINATION UNIT
18 INSTRUCTION UNIT
T CUTTING TOOL
P CUTTING POINT
F CUTTING FLUID

What is claimed is:

1. A numerical control device comprising:
a memory that stores a program; and
a processor configured to execute the program to:
make, on a basis of image data acquired when a visual sensor photographs a cutting fluid jetted from an injection nozzle toward a cutting point, a determination of whether or not the cutting fluid is applied to the cutting point; and
issue an instruction to a nozzle control device configured to control a position and an attitude of the injection nozzle on a basis of a result of the determination, wherein
the processor makes the determination on a basis of a shape of a path of the cutting fluid extracted from the image data by detecting the edge portions of the path by pattern matching.

2. The numerical control device according to claim 1, wherein
the processor makes the determination by machine learning.

* * * * *